United States Patent
Miao (10) Patent No.: US 11,412,146 B2
(45) Date of Patent: Aug. 9, 2022

(54) IMAGE ACQUISITION METHOD, PROCESSING METHOD AND DEVICE

(71) Applicant: Lenovo (Beijing) Co., Ltd., Beijing (CN)

(72) Inventor: Tao Miao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 102 days.

(21) Appl. No.: 16/729,181

(22) Filed: Dec. 27, 2019

(65) Prior Publication Data

US 2020/0137314 A1  Apr. 30, 2020

(30) Foreign Application Priority Data

Dec. 29, 2018 (CN) .......................... 201811653501.4

(51) Int. Cl.
*H04N 5/225* (2006.01)
*H04N 5/232* (2006.01)
*H04N 9/64* (2006.01)

(52) U.S. Cl.
CPC ..... *H04N 5/232933* (2018.08); *H04N 5/2253* (2013.01); *H04N 5/23229* (2013.01); *H04N 9/646* (2013.01)

(58) Field of Classification Search
CPC . H04N 5/2257; H04N 5/3696; H04M 1/0264; G09G 2360/14–142
USPC .................................................... 348/333.01
See application file for complete search history.

(56) References Cited

U.S. PATENT DOCUMENTS

| | | | | |
|---|---|---|---|---|
| 10,511,698 | B1* | 12/2019 | Chen | H04M 1/0264 |
| 10,691,283 | B2* | 6/2020 | Zhang | H04M 1/725 |
| 2013/0135328 | A1* | 5/2013 | Rappoport | G06F 3/0481 |
| | | | | 345/522 |
| 2017/0123575 | A1* | 5/2017 | Evans, V | H04M 1/0264 |
| 2017/0270342 | A1 | 9/2017 | He et al. | |
| 2018/0357952 | A1* | 12/2018 | Yang | H01L 27/326 |
| 2019/0373166 | A1* | 12/2019 | Jia | H04N 5/2257 |
| 2019/0373229 | A1* | 12/2019 | Zhang | H04M 1/0266 |
| 2020/0034100 | A1* | 1/2020 | Fan | G06F 3/1423 |
| 2021/0084236 | A1* | 3/2021 | Han | G06K 9/00013 |

FOREIGN PATENT DOCUMENTS

| | | |
|---|---|---|
| CN | 107580092 A | 1/2018 |
| CN | 108924306 A | 11/2018 |
| CN | 108924306 A * | 11/2018 |

* cited by examiner

*Primary Examiner* — Anthony J Daniels
(74) *Attorney, Agent, or Firm* — Anova Law Group, PLLC (57) ABSTRACT

The present disclosure provides an image acquisition and processing method. The method includes acquiring an invoking event being configured to invoke an image acquisition device located under a display screen, an acquisition window of the image acquisition device corresponding to a first area of the display screen; activating the image acquisition device based on the invoking event; determining a display state of the first area; acquiring an image by using the image acquisition device based on the display state of the first area; and displaying the acquired image.

14 Claims, 6 Drawing Sheets

IMAGE ACQUISITION METHOD, PROCESSING METHOD AND DEVICE

CROSS-REFERENCES TO RELATED APPLICATION

This application claims priority to Chinese Patent Application No. 201811653501.4, entitled "Image Acquisition Method, Processing Method and Device," filed on Dec. 29, 2018, the entire content of which is incorporated herein by reference.

FIELD OF TECHNOLOGY

The present disclosure relates to an image acquisition method, and a processing method and apparatus.

BACKGROUND

With the continued development of science and technology, electronic devices are changing with each passing day. In order to meet the needs of the users for large screens, recent development of display devices such as mobile phones and tablets tends to be full screen. With the increased screen ratio, the area left for the front camera, distance sensor, and other components is decreasing. In conventional technology, some full-screen phones may place the camera under the screen. However, with this arrangement, the content displayed in the corresponding area on the screen will affect the image acquired by the camera, which may affect the imaging and face recognition result, and the user experience may be poor.

BRIEF SUMMARY OF THE DISCLOSURE

One aspect of the present disclosure provides an image acquisition and processing method. The method includes acquiring an invoking event being configured to invoke an image acquisition device located under a display screen, an acquisition window of the image acquisition device corresponding to a first area of the display screen; activating the image acquisition device based on the invoking event; determining a display state of the first area; acquiring an image by using the image acquisition device based on the display state of the first area; and displaying the acquired image.

Another aspect of the present disclosure provides an image acquisition method. The method includes acquiring display information of display content in a first area of a display screen, the first area corresponds to an acquisition window of an image acquisition device being disposed under the display screen; acquiring an image through the image acquisition device; processing the acquired image based on the display information; and displaying a processed acquired image.

Another aspect of the present disclosure provides an image acquisition and processing apparatus. The apparatus includes an invoking module configured to obtain an invoking event for invoking an image acquisition device located under a display screen, an acquisition window of the image acquisition device corresponds to a first area of the display screen; an activation module configured to activate the image acquisition device based on the invoking event; a state determination module configured to determine a display state of the first area; an acquisition module configured to acquire an image by using the image acquisition device based on the display state of the first area; and an output module configured to output the acquired image.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION

Hereinafter, embodiments of the present disclosure are described with reference to the drawings. It is apparent that the disclosed embodiments are merely exemplary and not intended to limit the scope of the disclosure. Details will be illustrated to provide a thorough understanding of embodiments of the disclosure. However, it will be appreciated that one or more embodiments without the disclosed details may be implemented. In addition, descriptions of well-known structures and technologies are omitted herein to avoid unnecessarily obscuring the concept of the disclosure.

The terminologies used herein are merely for illustration, and are not intended to limit the disclosure. The terms "including," "comprising," and variations thereof herein indicate the presence of the features, steps, processes, and/or components, but are not intended to exclude the presence or addition of one or more other features, steps, processes, or components.

Unless otherwise defined, all the technical and scientific terms used herein have the same or similar meanings as generally understood by one of ordinary skill in the art. The terms used herein are to be interpreted as having a meaning consistent with the context of the specification and should not be interpreted in an ideal or too rigid manner.

As described herein, an expression similar to "at least one of A, B, and C" should be generally interpreted in accordance with the meaning of the expression as generally understood by those skilled in the art. For example, "an apparatus having at least one of A, B, and C" may include, but is not limited to, the apparatus having A alone, B alone, C alone, both A and B, both A and C, both B and C, and/or all of A, B, and C.

Some block diagrams and/or flowcharts are shown in the accompanying drawings. It should be understood that some blocks or combinations thereof in the block diagrams and/or flowcharts may be implemented by computer program instructions. The computer program instructions may be provided to a general purpose computer, a dedicated computer, or processors of other programmable data processing devices, so that the instructions, when being executed by the processor, may create means for implementing the functions/operations as described in the block diagrams and/or flowcharts. As such, the techniques of the present disclosure may be implemented in forms of hardware and/or software (including firmware, microcode, etc.). In addition, the techniques of the present disclosure may be embodied in a form of a computer program product on a computer readable medium storing instruction. The computer program product may be used by an instruction execution system or in conjunction with an instruction execution system.

The embodiments of the present disclosure provide a processing method and apparatus. The processing method includes acquiring an invoking event being used to invoke an image acquisition device located under a display screen, an acquisition window of the image acquisition device corresponds to a first area of the display screen; activating the image acquisition device based on the invoking event; determining a display state of the first area; acquiring an image by using the image acquisition device based on the display state of the first area; and displaying and outputting the acquired image.

In the embodiments of the present disclosure, when a camera is disposed under the display screen, in order to reduce the impact of the screen on the camera's image acquisition process, the image acquisition method of the camera can be determined based on the display state at the corresponding position on the screen. For example, if no content is displayed at the corresponding position on the screen and the screen is in a transparent state, the camera can be used to directly acquire the image as the screen may not impact the image acquisition process. Further, if content is displayed at the corresponding position on the screen, it may be necessary to perform image processing on the acquired image based on the display content at the position after image acquisition.

The embodiments of the present disclosure further provide an image acquisition method. The image acquisition method includes acquiring display information of display content in a first area of a display screen, the first area corresponds to an acquisition window of an image acquisition device being disposed under the display screen; acquiring an image through the image acquisition device; processing the acquired image based on the display information; and displaying and outputting a processed acquired image.

In the embodiments of the present disclosure, when a camera is disposed under the display screen, instead of detecting and controlling the display state of the screen, the camera can be used to directly acquire external images through the screen, and simultaneously acquire the display content of the corresponding area on the screen at the acquisition moment. The display content may be used to perform image processing on the acquired image to reduce the impact of the screen on the camera's image acquisition process.

It can be seen that both the processing method and the image acquisition method provided in the embodiments of the present disclosure can improve the situation of the under-the-screen camera being affected by the screen in the conventional technology, thereby achieving the technical effect of reducing the display content on the screen affecting the image acquisition process of the camera and improving the user experience.

Figure 1:
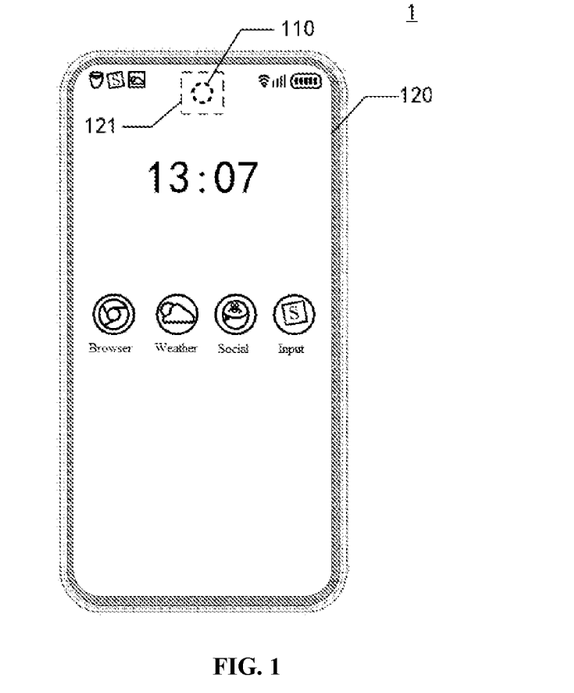
FIG. 1 a diagram illustrating an application scenario of a processing method and an image acquisition method according to an embodiment of the present disclosure.

FIG. 1 a diagram illustrating an application scenario of a processing method and an image acquisition method according to an embodiment of the present disclosure. It should be noted that FIG. 1 is merely an example of a processing method and an image acquisition method to which embodiments of the present disclosure can be applied to help those skilled in the art to understand the technical content of the present disclosure, it does not mean that the embodiments of the present disclosure cannot be used in other apparatuses, environments, or scenarios.

As shown in FIG. 1, the processing method and image acquisition method in the embodiments of the present disclosure can be used in a mobile phone 1. Various applications can be installed on the mobile phone 1, such as applications for camera applications, social applications, browser applications, email clients, and weather applications. The mobile phone 1 may also include hardware modules, such as a camera, a microphone, and a handset. The hardware modules can be enables in response to an application program call.

The image acquisition device in the embodiments of the present disclosure may be a front camera 110 disposed on the mobile phone 1. The front camera 110 may be disposed under a display screen 120. The display 120 may have a certain transparency. For example, the display screen 120 may be an OLED transparent screen. As such, the front camera 110 can acquire an external image through a first area 121 on the display screen 120.

Figure 2:
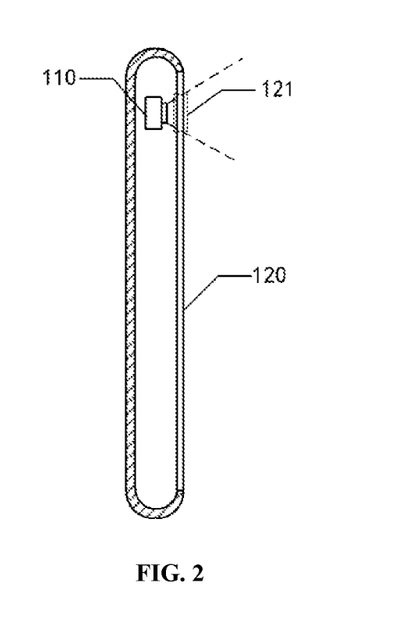
FIG. 2 is a diagram illustrating a side cross-sectional view of a mobile phone according to an embodiment of the present disclosure.

FIG. 2 is a diagram illustrating a side cross-sectional view of a mobile phone according to an embodiment of the present disclosure.

As shown in FIG. 2, the front camera 110 has a certain viewing range. The first area 121 corresponds to the viewing range of the front camera 110. The first area 121 may be a screen area located with the viewing range of the front camera 110. The position and size of the first area 121 may correspond to the position and viewing angle of the lens of the front camera 110.

The display content on the first area 121 of the display screen will affect the quality of the images acquired by the front camera 110. For example, the color displayed on the first area 121 may distort the color of the acquired image, and the brightness on the first area 121 may affect the brightness of the acquired image.

The processing method and the image acquisition method of the embodiments of the present disclosure may take the corresponding process based on the display conditions of the first area 121 to reduce the impact of the display content of the screen on the image acquisition process of the camera, and provide a better user experience.

In addition, the processing method and the image acquisition method of the embodiments of the present disclosure can also be applied to other electronic devices, such as a tablet computer, a notebook computer, etc.

Figure 3:
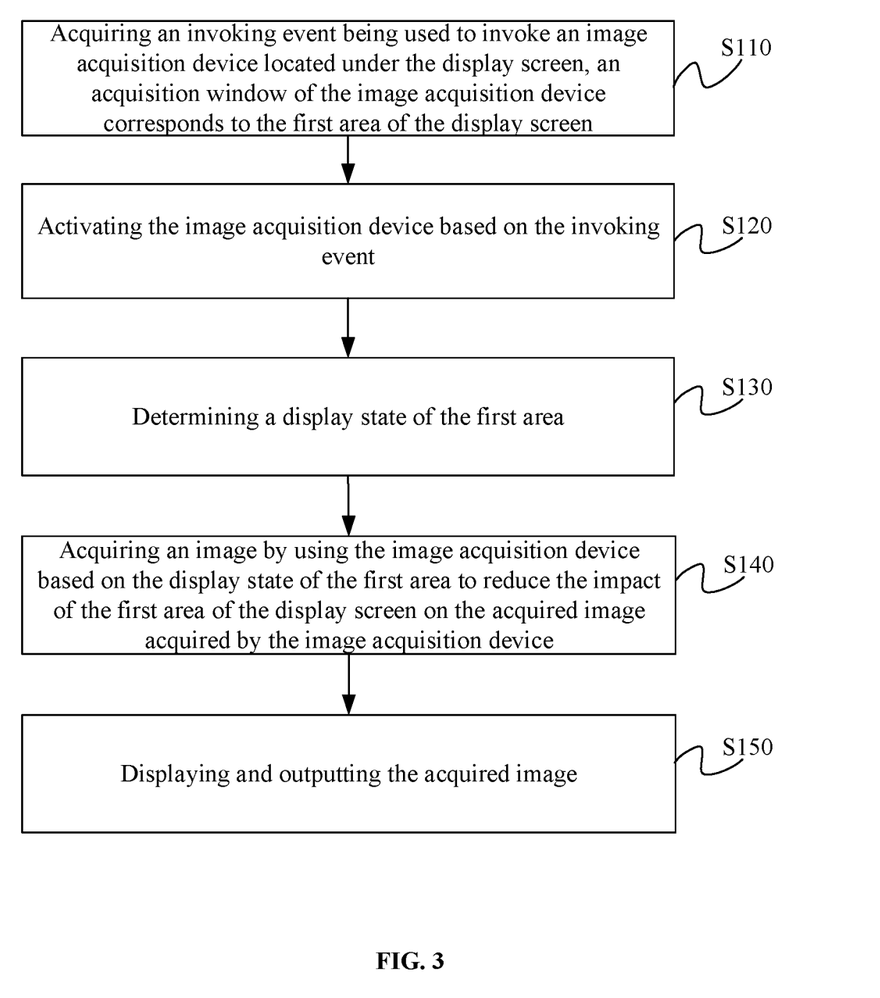
FIG. 3 is a flowchart illustrating the processing method according to an embodiment of the present disclosure.

FIG. 3 is a flowchart illustrating the processing method according to an embodiment of the present disclosure. The processing method is described in detail below.

S110, acquiring an invoking event, the invoking event may be used to invoke the image acquisition device located under the display screen, and an acquisition window of the image acquisition device may correspond to the first area of the display screen.

As described above, the image acquisition device may be, for example, the front camera 110, and the acquisition window of the image acquisition device may be a lens of the front camera 110. The first area of the display screen may cover the front of the lens, and the front camera 110 may acquire external images through the first area.

The invoking event may be used to invoke the image acquisition device. The invoking event may be, for example, an invoking request of an application A for the front camera 110. In some embodiments, the application A may be a camera application or other applications with a camera calling permission.

S120, activating the image acquisition device based on the invoking event.

For example, based on the application A's invoking request for the front camera 110, the front camera may be turned on, and the front camera 110 may enter an operating state.

S130, determining a display state of the first area.

For example, the display state of the first area may include whether an image is displayed in the first area, that is, whether each pixel unit of the first area is in a working state. In some embodiments, if no image is displayed in the first area, each pixel unit in the first area may not emit light and may not output any color, as such, the first area may be colorless and transparent. In some embodiments, if an image is displayed in the first area, each pixel unit in the first area may emit light, and a corresponding color may be displayed based on the display convent, as such, the first area may be in a non-transparent state. It should be noted that the non-transparent state may be merely a presentation state that can be distinguished from the colorless and transparent state described above. For example, the non-transparent state may be a state that may be colored but not transparent, such as a colored glass, or a state that may be less transparent than a colorless and transparent state, which may is not a completely opaque state. Therefore, under the non-transparent state, the camera can still acquire an external image through the first area.

S140, acquiring an image by using the image acquisition device based on the display state of the first area to reduce the impact of the first area of the display screen on the acquired image acquired by the image acquisition device.

For example, based on whether an image is displayed in the first area, a corresponding method may be selected to acquire the final image to be displayed by the image acquisition device to avoid acquiring a final image with distorted color and brightness.

In some embodiments, S140 may include one or more operations of S141-S143.

S141, acquiring the acquired image directly through the image acquisition device if the display state of the first area is transparent.

When the camera acquires images, the camera may acquire a frame of image at intervals and display a frame of image on the display screen.

The display state of the first being transparent may include the first area being transparent when the first frame of image is acquired at the moment the camera is turned on, or the first area being constantly transparent when the camera is turned on and after the camera is turned on.

For example, the camera can be turned on when the display screen is off. When the camera acquires the first frame of image, the display screen may be off and the first area of the display screen may be transparent. The camera can directly acquire the acquired image through the first area without being affect by the display content of the display screen. Alternatively, the first area may be controlled to remain transparent when and after the camera is turned on, that is, the content may not be displayed in the first area when the camera acquires each frame of image and during the acquisition interval, such that the acquired image may not be affected.

S142, controlling the display state of the first area to be a transparent state and acquiring the acquired image through the image acquisition device if the display state of the first area is a non-transparent state.

The first area may be controlled to be in a non-transparent state during the acquisition interval and in a transparent state at the acquisition moment. For example, after the camera is turned on, the first area may be controlled to be transparent when each frame of image is acquired, and display normal content during the acquisition interval. Since the camera acquisition moment is short, the first area that the user sees may be displaying normal content based on the visual persistence phenomenon. As such, in this case, images may be acquired normally without affecting the user's visual experience.

Alternatively, the first area may be controlled to be changed from the non-transparent state to the transparent state and remain in the transparent state thereafter if the first area is in a non-transparent state after the camera is turned on. For example, after the camera is turned on, the first area may be controlled to change from a non-transparent state to a transparent state if the first area of the first few frames of image acquisition moment and the acquisition intervals are in the non-transparent state. The first area may remain in the transparent state at the subsequent image acquisition moments and acquisition intervals.

S143, acquiring display information of the first area and acquiring the acquired image through the image acquisition device if the display state of the first area is a non-transparent state; and processing the acquired image based on the display information, where the display information of the first area may be used to present the display content of the first area.

For example, after the camera is turned on, the first area may remain in the non-transparent state and display normal content. In this case, the display information of the first area at the camera acquisition moment may be acquired, and the acquired image may be processed by using the display information to reduce or eliminate the impact of the display content of the first area on the acquired image. For example, if the first area is displaying red at the camera acquisition moment, which may be equivalent to adding a layer of red "filter" to the acquired image. After acquiring the acquired image, the acquired red information of the first area may be used to correct the acquired image to remove the red "filter".

In some embodiments, after processing the acquired image based on the display information in operation S143, the method may further include operation S144.

S144, updating the display content of the first area of the display screen based on image information of a first part of the acquired image.

After processing the acquired image based on the display information of the first area, a processed acquired image may be acquired. The processed acquired image may need to be displayed on the display screen to replace the previous frame of acquired image on the display screen. In some embodiments, the first part of the processed acquired image may correspond to the first area of the display screen, and the image information of the first part of the processed acquired image may be used as the display content of the first area to process the next frame of the acquired image.

The image acquisition and display process may be as follow. An optical image generated by the scene through the lens of the camera is projected onto the surface of an image sensor and then converted into an analog image signal (i.e., an electrical signal). The analog image signal is converted into a digital image signal after an analog-to-digital (A/D) conversion, and then transmitted to a digital signal process (DSP) chip for processing. Subsequently, the processed screen is then displayed on the display screen.

In some embodiments, the display information may be the color value of each pixel in the first area.

In some embodiments, processing the acquired image based on the display information in operation S143 may include operations S1431 and S1432.

S1431, determining correction parameters based on the color value of each pixel.

S1432, processing the acquired image based on the correction parameters.

For example, in the image acquisition process, a color value (e.g., an RGB value) of each pixel in the first area at the acquisition moment may be acquired in a display image buffer.

In the image acquisition process, if the color value of each pixel in the first area is the same, for example, each pixel is displaying red with the color value of (255, 0, 0), the color value can be used as a correction parameter of the entire acquired image, and the acquired image may be corrected based on the color value.

If a plurality of pixels in the first area are displaying different colors, the correction parameters may be determined in blocks. First, at least one correction reference area may be determined based on the color value of each pixel point in the first area, where the color similarity of each pixel point in the correction reference area may exceed a predetermined threshold. For example, if several adjacent pixels in the first area are displaying red with the color value of (255, 0, 0), and the remaining pixels are displaying green with the color value of (0, 255, 0), the red area may be determined as the first correction reference area and the remaining areas may be determined as the second correction reference area. Then, the correction parameter may be determined based on the color value of at least one pixel point in the correction reference area. For example, the correction parameter of the first correction reference area may be the color value (255, 0, 0) and, the correction parameter of the second correction reference area may be the color value (0, 255, 0). Subsequently, an area to be corrected on the image may be determined based on at least one correction area. For example, the image areas on the acquired image corresponding to the first correction reference and the second correction reference area may be respectively determined. Lastly, the corresponding areas to be corrected may be corrected based on each correction parameter.

In addition, if a plurality of pixels in the first area are displaying different colors, the correction parameters may also be determined for each pixel.

S150, displaying and outputting the acquired image.

After acquiring the acquired image, the display screen may be used to display and output the acquired image. The acquired image may be an image directly acquired by the camera through the transparent area, or an image processed using the display information of the first area.

In some embodiments, the processing method of the embodiments of the present disclosure may further include operations S160 and S170.

S160, maintaining the transparent state of the first area until the image acquisition device is in a low power consumption state if the display state of the first area is transparent.

S170, switching the display state of the first area to a non-transparent state and displaying based on the content to be display if the image acquisition device is in a low power consumption state.

For example, the image acquisition device being in a low power consumption state may be a state in which the camera invoking is completed, for example, when the camera is turned off, the camera stops acquiring images, or the display screen no longer displays the image acquired by the camera.

In some embodiments, maintaining the transparent state of the first area until the image acquisition device is in a low power consumption state if the display state of the first area is transparent may include maintaining the first area in the transparent state until the camera is turned off if the first area is constantly in the transparent state after the camera is turned on; or, maintaining the first area in the transparent state until the camera is turned off if the first area changes from the non-transparent state to the transparent state after the camera is turned on.

In some embodiments, after the camera invoking is ended, the first area can be switched from a transparent state to a non-transparent state and display based on the content to be displayed.

In some embodiments, the processing method of the embodiments of the present disclosure may further include operation S180.

S180, displaying an interactive interface.

The interactive interface may include a prompt area, which may be used to indicate that the image acquisition device is in an operating state. In particular, if the interactive interface is displayed on the display screen, the prompt area may correspond to the outer edge of the first area.

In some embodiments, the interactive interface may further include an output area, the output area may be used to display the acquired image in real time.

Figure 4:
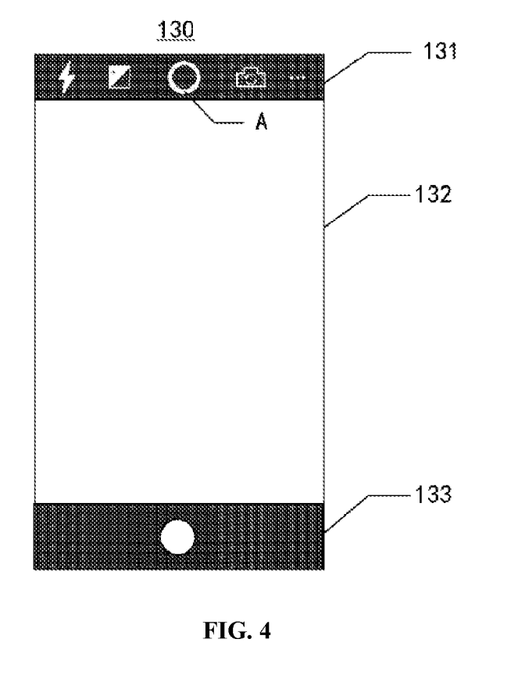
FIG. 4 is a diagram illustrating an interactive interface according to an embodiment of the present disclosure.

FIG. 4 is a diagram illustrating an interactive interface according to an embodiment of the present disclosure.

As shown in FIG. 4, an interactive interface 130 is displayed on the display screen. The interactive interface may include a setting area 131, an output area 132, and an imaging area 133. In some embodiments, the output area 132 may be used to display the acquired image in real time. The background of the setting area 131 and the imaging area 133 may be black, and a plurality of interaction options may be arranged on the black background, for example, the interaction options may include a flash option, a camera switch option, an imaging option, etc.

A prompt area A may be arranged in any one of the setting area 131, the output area 132, and the imaging area 133. The prompt area may correspond to the outer edge of the first area, and the color of the prompt area A may be different from the surrounding colors. As such, the user may be reminded of the position of the camera when taking picture, and that the camera is in an operating state.

If the front camera is disposed behind the setting area 131 and the imaging area 133, that is, the first area is a part of the setting area 131 and the imaging area 133, regardless of the state of the first area (e.g., transparent or non-transparent), the first area will be black in the visual effects and blend in with the background. In this case, the user may be unsure of the position of the camera, which may be difficult when taking a selfie or performing racial recognition. Therefore, the prompt area A may be arranged at the edge of the first area, and the prompt area A may be a color different from the black background, such as in red or white. As such, the user may be reminded that the camera is disposed at the area circled be the prompt area A.

If the front camera is disposed behind the output area 132, that is, the first area is a part of the output area 132. When the first area is in a non-transparent state, the first area and its surrounding areas may display the acquired image. In this case, the user may be unsure of the position of the camera. Therefore, the first area may be circled by using the prompt area A, and the color of the prompt area A may be different from the surrounding colors. As such, the user may be reminded that the camera is disposed in the area circled by the prompt area A. When the first area is in a transparent state, the first area may be displayed as black, and its outer area may display the acquired image. The black part may be more abrupt in the acquired image, as such, the first area may be circled by using the prompt area A, which can improved the interface effect, and the user can be aware that the camera is disposed in the area surrounded by the prompt area A.

In some embodiments, if the display state of the first area is a transparent state, the visual effect of the first area on the interactive interface displayed on the interactive interface may be a hole.

Those skilled in the art can understand that when the first area is in the transparent state, the user may view the first area as a block hole, but in fact, the first area is merely not displaying any content at this point, and the first area is still a part of the display screen, not a hole in the true sense.

In some embodiments, the output area may include any one of the following arrangements. The output area 132 may not include the prompt area A; the output area 132 may not include the area corresponding to the first area of the display screen; the output area 132 may include the prompt area A; or the output area 132 may include the area corresponding to the first area of the display screen.

As described above, the prompt area A may be arranged in the output area 132 or outside the output area 132, for example, the output area 132 may be arranged in the setting area 131 and the imaging area 133.

An embodiment of the present disclosure further provides an image acquisition method.

Figure 5:
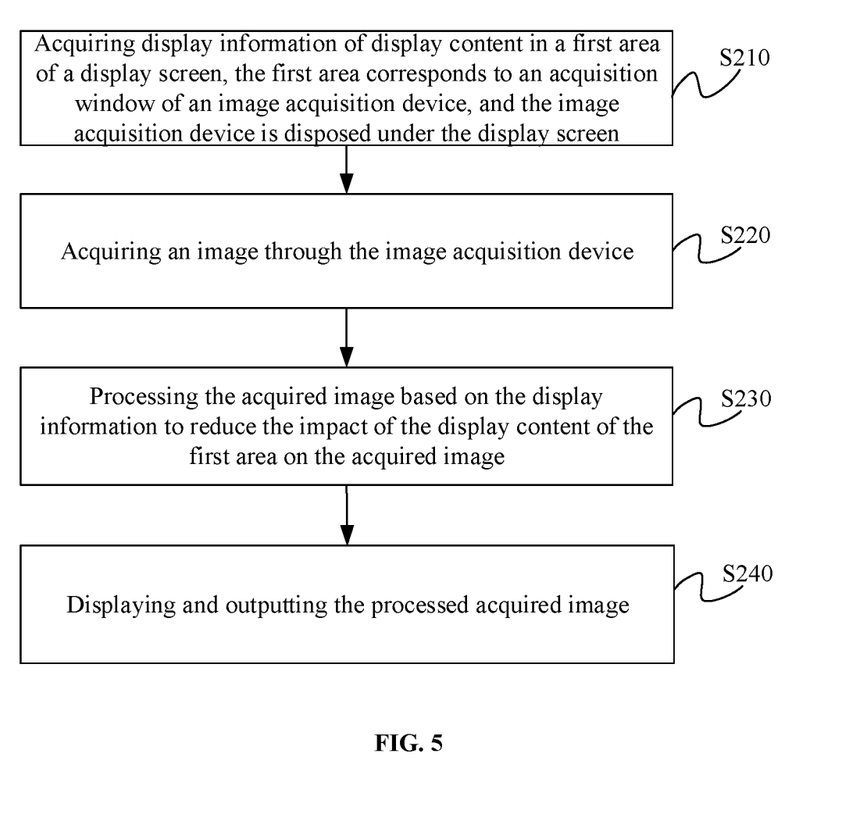
FIG. 5 is a flowchart illustrating the image acquisition method according to an embodiment of the present disclosure.

FIG. 5 is a flowchart illustrating the image acquisition method according to an embodiment of the present disclosure. The image acquisition method is described in detail below.

S210, acquiring display information of display content in a first area of a display screen, the first area may correspond to an acquisition window of an image acquisition device, and the image acquisition device may be disposed under the display screen.

S220, acquiring an image through the image acquisition device.

S230, processing the acquired image based on the display information to reduce the impact of the display content of the first area on the acquired image.

S240, displaying and outputting the processed acquired image.

After the camera is turned on, the first area may be used to display normal content and remain in a non-transparent state. In this case, the display information of the first area may be acquired at the camera acquisition moment, and the acquired image may be processed using the display information of the first area to reduce or eliminate the impact of the display content of the first area on the acquired image. For example, if the first area is displaying red at the camera acquisition moment, which may be equivalent to adding a layer of red "filter" to the acquired image. After acquiring the acquired image, the acquired red information of the first area may be used to correct the acquired image to remove the red "filter".

The difference between the image acquisition method of the present embodiment and the processing method described above is that the image acquisition method of the present embodiment does not need to detect the restricted state of the first area of the display screen. Further, the image acquisition method of the present embodiment does not need to control the display state of the first area. The first area may display normal content like other areas. By directly using the camera to acquire external images through the screen and acquiring the display content of the corresponding area on the screen at the acquisition moment at the same time, the display content may be used to perform image processing on the acquired image, thereby reducing the impact of the screen on the camera's image acquisition process.

Although the processing method described above also mentioned acquiring the display information of the first area when the first area is in a non-transparent state, acquiring the acquired image through the image acquisition device, and processing the acquired image based on the display information. However, the processing method described above needs to first detect the display state of the first area, control the display state of the first area in some cases, and determine the corresponding acquisition method based on the display state of the first area in order to reduce the impact of the screen on the camera's image acquisition process.

An embodiment of the present disclosure further provides a processing apparatus 300.

Figure 6:
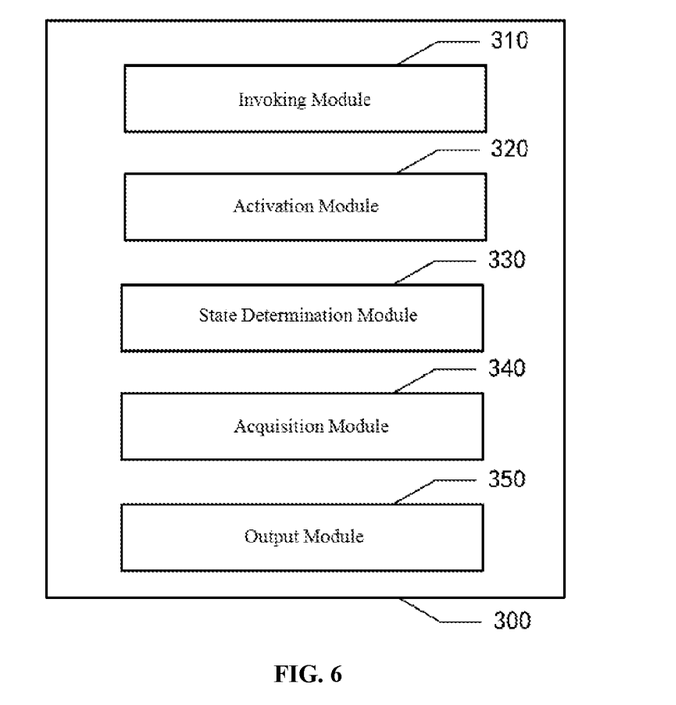
FIG. 6 is a block diagram illustrating a processing apparatus according to an embodiment of the present disclosure.

FIG. 6 is a block diagram illustrating a processing apparatus according to an embodiment of the present disclosure.

As shown in FIG. 6, the processing apparatus 300 includes an invoking module 310, an activation module 320, a state determination module 330, an acquisition module 340, and an output module 350.

In some embodiments, the invoking module 310 may be configured to acquire an invoking event. The invoking event may be used to invoke the image acquisition device located under the display screen, and the acquisition window of the image acquisition device may correspond to the first area of the display screen.

In some embodiments, the activation module 320 may be configured to activate the image acquisition device based on the invoking event.

In some embodiments, the state determination module 330 may be configured to determine a display state of the first area.

In some embodiments, the acquisition module 340 may be configured to acquire an image by using the image acquisition device based on the display state of the first area to reduce the impact of the first area of the display screen on the acquired image acquired by the image acquisition device.

In some embodiments, the output module 350 may be configured to display and output the acquired image.

In some embodiments, the acquisition module 340 may include one of more of the following sub-modules.

A first acquisition sub-module configured to directly acquire an image through an image acquisition device when the display state of the first area is a transparent state.

A second acquisition sub-module configured to control the display state of the first area to be in a transparent state when the display state of the first area is a non-transparent state, and acquire an image through an image acquisition device.

A third acquisition sub-module configured to acquire display information of the first area when the display state of the first area is a non-transparent state, and acquire an image through an image acquisition device; and process the acquired image based on the display information, where the display information of the first area may be used to present the display content of the first area.

In some embodiments, the processing apparatus 300 may further include a switching module. The switching module may be configured to maintain the transparent state of the first area until the image acquisition device is in a low power consumption state when the display state of the first area is a transparent state; and switch the display state of the first area to a non-transparent state and display based on content to be display when the image acquisition device is in a low power consumption state.

In some embodiments, the processing apparatus 300 may further include an interaction module. The interaction module may be configured to display an interactive interface.

The interactive interface may include a prompt area, and the prompt area may be used to indicate that the image acquisition device is in an operating state. In particular, if the interactive interface is displayed on the display screen, the prompt area may correspond to the outer edge of the first area.

In some embodiments, if the display state of the first area is a transparent state, the visual effect of the first area on the interactive interface displayed on the interactive interface may be a hole.

In some embodiments, the interactive interface may include an output area. The output area may be used to display acquired image in real time. The output area may include any one of the following arrangements. The output area may not include the prompt area; the output area may not include the area corresponding to the first area of the display screen; the output area may include the prompt area; or the output area may include the area corresponding to the first area of the display screen.

In some embodiments, the second acquisition sub-module may include an update module. The update module may be configured to update the display content of the first area of the display screen by using the first part of the acquired image.

In some embodiments, the display information may be the color value of each pixel in the first area.

In some embodiments, the second acquisition sub-module may further include a color sub-module configured to determine correction parameters based on the color value of each pixel, and a processing module configured to process the acquired image based on the correction parameters.

An embodiment of the present disclosure further provides an image acquisition device 400.

Figure 7:
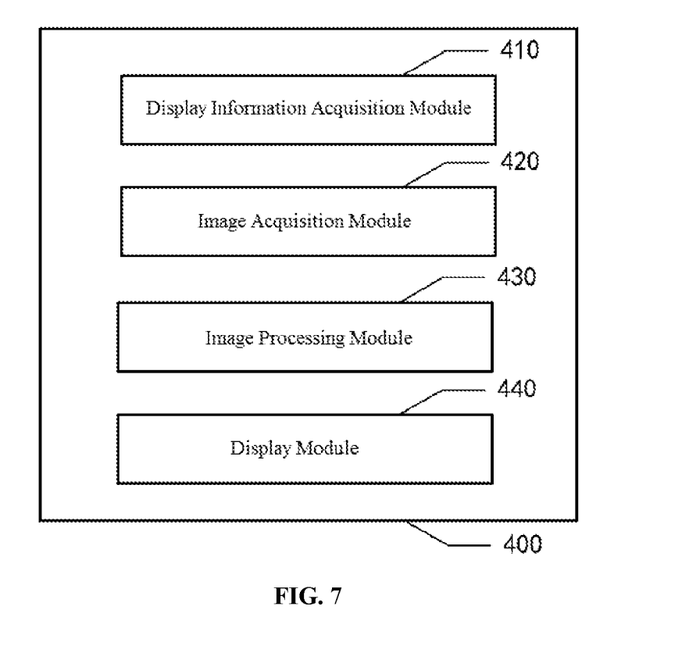
FIG. 7 is a block diagram illustrating an image acquisition device according to an embodiment of the present disclosure.

FIG. 7 is a block diagram illustrating an image acquisition device according to an embodiment of the present disclosure.

As shown in FIG. 7, the image acquisition device includes a display information acquisition module 410, an image acquisition module 420, an image processing module 430, and a display module 440.

The display information acquisition module 410 may be configured to acquire display information of display content in a first area of a display screen, the first area corresponds to an acquisition window of the image acquisition device, and the image acquisition device may be disposed under the display screen.

The image acquisition module 420 may be configured to acquire an image through the image acquisition device.

The image processing module 430 may be configured to process the acquired image based on the display information to reduce the impact of the display content of the first area on the acquired image.

The display module 440 may be configured to display and output the processed acquired image.

In the embodiments of the present disclosure, a combination of multiple modules, sub-modules, units, and sub-units, or at least some of their functions may be implemented in a single module. Any single module, sub-module, unit, and sub-unit may be split into a plurality of modules. Any one or more of the modules, sub-modules, units, sub-units may be implemented at least partially as hardware circuits, such as field programmable gate arrays (FPGAs), programmable logic arrays (PLAs), system-on-chips (SoCs), system-on-substrates (SoSs), system in packages (SiPs), an application-specific integrated circuits (ASICs), or any other reasonable means of hardware or firmware that integrates or encapsulates the circuit, or implemented by one or any suitable combinations of software, hardware, and firmware. Alternatively, one or more of the modules, sub-modules, units, or sub-units may be implemented at least in part as a computer program that, when executed, may perform the corresponding functions.

For example, a multiple of modules and sub-modules can be combined into one module, or any one of the modules and sub-modules can be split into multiple modules. Alternatively, at least part of the functions of one or more of these modules can be combined with at least part of the functions of other modules and implemented in one module. In some embodiments, at least one of the various module and sub-modules can be implemented at least in part as a hardware circuit, such as a FPGA, a PLA, a SoC, a SoSs, a SiP, an ASIC, or any other reasonable means of hardware or firmware that integrates or encapsulates the circuit, or implemented by one or any suitable combinations of software, hardware, and firmware. Alternatively, at least one of the various modules and sub-modules can be implement at least in part as a computer program that, when executed, may perform the corresponding functions.

Figure 8:
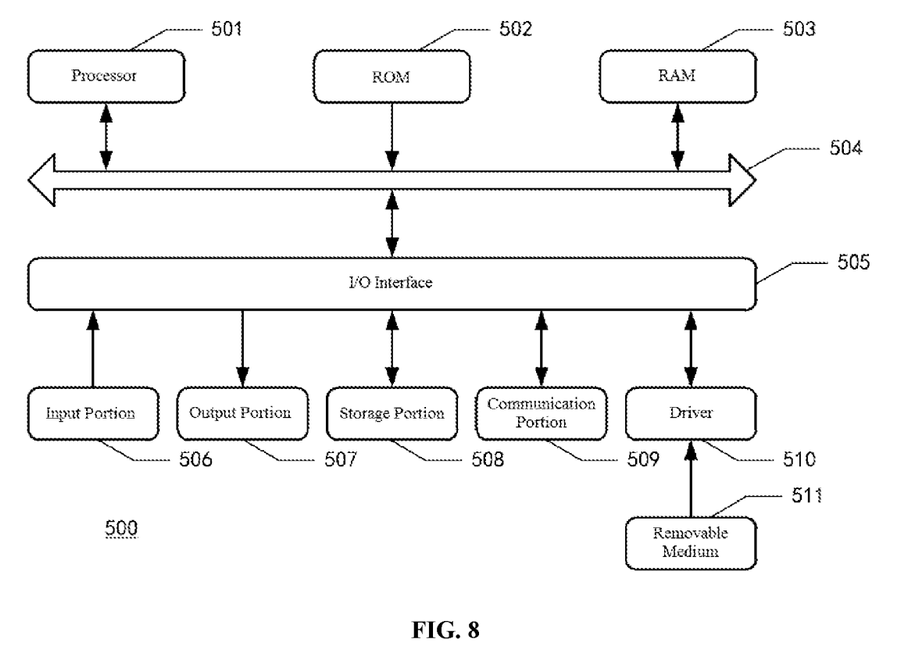
FIG. 8 is a block diagram illustrating a computer system suitable for implementing the method described in the present disclosure according to an embodiment of the present disclosure.

FIG. 8 is a block diagram illustrating a computer system suitable for implementing the method described in the present disclosure according to an embodiment of the present disclosure. The computer system shown in FIG. 8 is merely an example and is not intended to limit the function and scope of the present disclosure.

As shown in FIG. 8, a computer system 500 includes a processor 510, a computer readable storage medium 520, a signal transmitter 530, and a signal receiver 540. The computer system 500 may be used to execute the methods consistent with the embodiments of the present disclosure.

The processor 510 can include, for example, a general purpose microprocessor, an instruction set processor, a chipset, and/or a special purpose microprocessor (e.g., an application specific integrated circuit (ASIC)), or the like. The processor 510 can also include an onboard memory for caching. The processor 510 can be a single processing unit or a plurality of processing units for implementing different processes of the methods consistent with the embodiments of the present disclosure.

Computer readable storage medium 520 can include, for example, a non-volatile computer readable storage medium.

For example, the readable storage medium can include, but is not limited to, an electronic, magnetic, optical, electromagnetic, infrared, or semiconductor system, apparatus, device, or propagation medium. The readable storage medium can include, for example, a magnetic storage apparatus, e.g., a magnetic tape or a hard disk (HDD), an optical storage apparatus, e.g., a compact disk (CD-ROM), a memory, e.g., a random access memory (RAM) or a flash memory, and/or a wired/wireless communication link.

The computer readable storage medium 520 can include a computer program 521. The computer program 521 can include code/computer executable instructions that, when executed by the processor 510, cause the processor 510 to implement methods consistent with the embodiments of the present disclosure, or any variation thereof.

The computer program 521 can be configured to have, for example, computer program codes including computer program modules. In some embodiments, the codes in computer program 521 can include one or more program modules including, for example, module 521A, module 521B, and/or the like. It can be appreciated that the division manner and number of modules are not fixed, and those skilled in the art can use any suitable number of program modules or combination of the program modules according to actual situations. When the combination of the program modules is executed by the processor 510, the processor 510 can implement the methods consistent with the embodiments of the present disclosure, or any variation thereof.

In some embodiments, the processor can interact with the signal transmitter 530 and the signal receiver 540 to implement the methods consistent with the embodiments of the present disclosure, or any variation thereof.

In some embodiments, one or more modules and submodules can be implemented as a computer program module described with reference to FIG. 5. The computer program module, when executed by the processor 510, can implement the corresponding processes described above.

In one embodiment of the present disclosure, a camera can be disposed under a display screen. During the image acquisition process, the camera can acquire a first area corresponding to the camera on the display screen adjusted to be transparent, and display a circle (e.g., a red circle) on the current interface to indicate that the camera is operating.

In another embodiment of the present disclosure, a camera can be disposed under a display screen. During the image acquisition process, the camera can acquire the display parameters (i.e., the display parameters corresponding to the previous frame of image in a first area) of the first area corresponding to the camera on the display screen to process the currently acquired image (i.e., the current frame of image), such that the currently acquired image can filter out the display parameters of the first area, thereby reducing the impact of the overall display image on the display screen to the image acquired by the camera.

The present disclosure further provides a computer readable medium, which may be included in the apparatus/device/system described in the above embodiments; or may be separately present without being incorporated into the apparatus/device/system. The computer readable medium may store one or more programs that implement the method provided in the foregoing description when the one or more programs are executed.

In the embodiments of the present disclosure, the computer readable storage medium may be a non-volatile computer readable storage medium, which may include, but is not limited to a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the foregoing. In the present disclosure, the computer readable storage medium can include any tangible medium that contains or stores a program. The program can be used by or in connection with an instruction execution system, apparatus, or component.

The flowchart and block diagrams in the drawings illustrate the architecture, functionality, and operation of possible implementations of systems, methods, and computer program products according to various embodiments of the present disclosure. In this regard, each block of the flowchart or block diagrams may represent a module, a program segment, or a portion of code that includes one or more logic functions for implementing the specified executable instructions. Alternatively, the functions described in the blocks may be performed in a sequence different from as shown in the diagrams. For example, two blocks shown in succession may in fact be executed substantially in parallel, and they may sometimes be executed in the reversed order, depending upon the functionality involved. Further, each block of the block diagrams or flowcharts, and combinations of blocks in the block diagrams or flowcharts, may be implemented in a dedicated hardware-based system that performs the specified function or operation, or be implemented with a combination of dedicated hardware and computer instructions.

It will be appreciated by those skilled in the art that the features described in the disclosure embodiments and/or the claims of the present disclosure can be combined in various combinations, even if such combinations are not explicitly recited in the present disclosure. The various features of the disclosed embodiments and/or claims of the present disclosure can be combined in various combinations without departing from the spirit and scope of the disclosure. All such combinations are within the scope of the disclosure.

Although the present disclosure has been shown and described with respect to the exemplary embodiments of the present disclosure, it will be apparent to those skilled in the art that various changes can be made to the form and detail of the present disclosure without departing from the spirit and scope of the disclosure. Therefore, the scope of the present disclosure should not be limited to the above-described embodiments, but should be determined not only by the appended claims but also by the equivalents of the appended claims.

What is claimed is:

1. An image acquisition and processing method, comprising:
   acquiring an invoking event configured to invoke an image acquisition device located under a display screen, an acquisition window of the image acquisition device corresponding to a first area of the display screen;
   activating the image acquisition device based on the invoking event;
   determining a display state of the first area;
   acquiring an image by using the image acquisition device based on the display state of the first area being in a transparent state;
   switching the display state of the first area to be in the transparent state, acquiring display information of the first area, and acquiring the image through the image acquisition device in response to the display state of the first area being in a non-transparent state, and processing the acquired image based on the display information, wherein the display information of the first area is used to present display content of the first area; and displaying the acquired image.

2. The method of claim 1, further including:

maintaining the transparent state of the first area until the image acquisition device is in a low power consumption state in response to the display state of the first area being in the transparent state; and switching the display state of the first area to the non-transparent state and displaying based on content to be displayed in response to the image acquisition device being in the low power consumption state.

3. The method of claim 1, further comprising, displaying the interactive interface, a visual effect of presented content by the interactive interface being that the first area on the interactive interface is a hole in response to the display state of the first area being in the transparent state.

4. The method of claim 1, wherein the interactive interface includes an output area for displaying the acquired image in real time, the output area including any one of the following format:

the output area does not include the prompt area; or the output area does not include the area corresponding to the first area of the display screen; or the output area includes the prompt area; or, the output area includes the area corresponding to the first area of the display screen.

5. The method of claim 4, wherein:

the display information is a color value of each pixel in the first area, and processing the acquired image based on the display information includes:

determining correction parameters based on the color value of each pixel; and processing the acquired image based on the correction parameters.

6. The method of claim 1, further includes:

updating the display content of the first area of the display screen based on image information of a first part of the acquired image.

7. The method of claim 1, further including:

displaying an interactive interface, the interactive interface includes a prompt area for prompting the image acquisition device being in an operating state, wherein the prompt area corresponds to an outer edge of the first area in response to the interactive interface being displayed on the display screen.

8. An image acquisition and processing apparatus, comprising:

an invoking circuitry configured to obtain an invoking event for invoking an image acquisition device located under a display screen, an acquisition window of the image acquisition device corresponds to a first area of the display screen;

an activation circuitry configured to activate the image acquisition device based on the invoking event;

a state determination circuitry configured to determine a display state of the first area;

an acquisition circuitry configured to acquire an image by using the image acquisition device based on the display state of the first area, wherein the acquisition circuitry further configured to switch the display state of the first area to be in the transparent state, acquire the image through the image acquisition device in response to the display state of the first area being in a non-transparent state; and an output circuitry configured to output the acquired image.

9. The apparatus of claim 8, wherein the acquisition circuitry is further configured to perform one or more of the following operations:

maintaining the transparent state of the first area until the image acquisition device is in a low power consumption state in response to the display state of the first area being in the transparent state; and switching the display state of the first area to the non-transparent state and displaying based on content to be display in response to the image acquisition device being in the low power consumption state.

10. The apparatus of claim 9, wherein the acquisition circuitry is further configured to perform:

displaying an interactive interface, the interactive interface includes a prompt area for prompting the image acquisition device being in an operating state, wherein the prompt area corresponds to an outer edge of the first area in response to the interactive interface being displayed on the display screen.

11. The apparatus of claim 8, wherein the acquisition circuitry is further configured to perform:

displaying an interactive interface, visual effect of presented content by the interactive interface being that the first area on the interactive interface is a hole in response to the display state of the first area being in the transparent state.

12. The apparatus of claim 11, wherein the interactive interface includes an output area for displaying the acquired image in real time, the output area including any one of the following format:

the output area does not include the prompt area; or the output area does not include the area corresponding to the first area of the display screen; or the output area includes the prompt area; or, the output area includes the area corresponding to the first area of the display screen.

13. The apparatus of claim 8, wherein the acquisition circuitry is further configured to perform:

updating the display content of the first area of the display screen based on image information of a first part of the acquired image.

14. The apparatus of claim 13, wherein:

the display information is a color value of each pixel in the first area, and processing the acquired image based on the display information includes:

determining correction parameters based on the color value of each pixel; and processing the acquired image based on the correction parameters.

* * * * *